Jan. 24, 1928.

H. D. HAMP 1,657,257

AUTOMOBILE SCREEN

Filed Sept. 11, 1926

Inventor
Henry D. Hamp
By E. Walton Bennington
Attorney

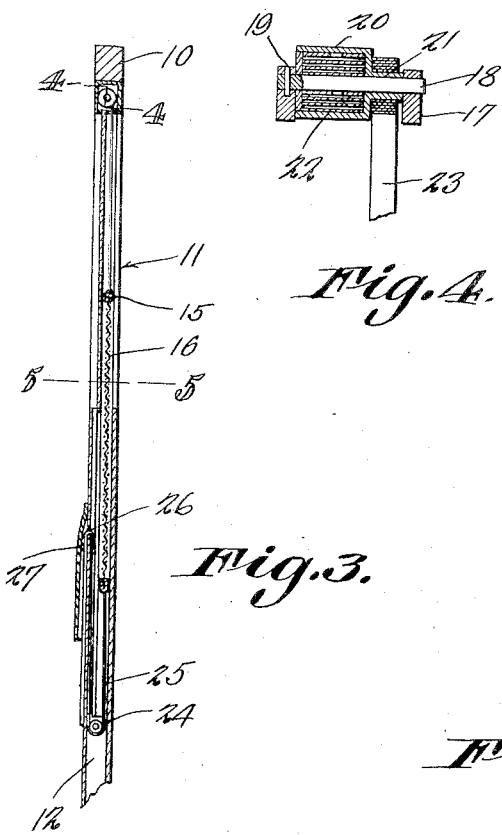
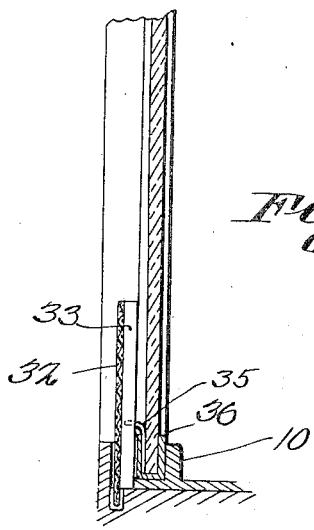
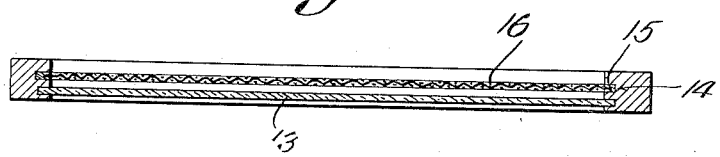
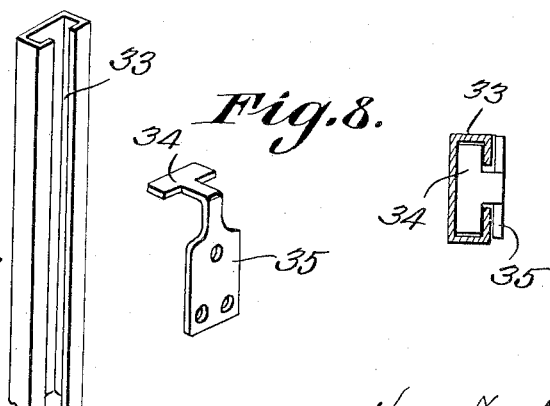
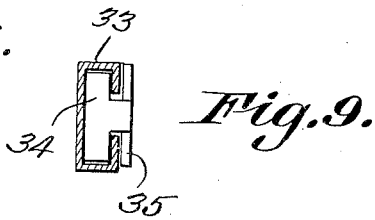

Patented Jan. 24, 1928.

1,657,257

UNITED STATES PATENT OFFICE.

HENRY D. HAMP, OF BALTIMORE, MARYLAND.

AUTOMOBILE SCREEN.

Application filed September 11, 1926. Serial No. 134,824.

This invention relates to vehicle bodies such as are used on automobiles and the like and has special reference to insect screens for automobile bodies.

As is well known, it is very unpleasant to drive an automobile through country infested with insects and with the windows and windshields open. This is especially true at night since the headlights attract the insects and they are swept back into the body of the vehicle. Moreover, accidents have occurred through insects striking the eyes of automobile drivers under these conditions.

One important object of the present invention is to provide an improved arrangement of insect screens for automobile window openings, the screens being so arranged that they may be moved in and out of screening position at will and being also arranged to be housed in the wall of the body or door, as the case may be, when not in use.

A second important object of the invention is to provide improved means for operating such screens.

A third important object of the invention is to provide an improved screen arrangement for use in connection with the modern sliding type of windshield.

A fourth important object of the invention is to provide improved means for holding the screen closely against the lower edge of the windshield upon the latter being opened.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is a section on the line 3—3 of Figure 2.

Figure 4 is an enlarged detail section on the line 4—4 of Figure 3.

Figure 5 is an enlarged section on the line 5—5 of Figure 3.

Figure 6 is a vertical section through a portion of the windshield and its screen.

Figure 7 is an enlarged perspective of a channel strip used on the windshield screen.

Figure 8 is an enlarged perspective of a guide lug used in connection with said channel strip.

Figure 9 is a detail horizontal section showing the assembling of the parts shown in Figures 7 and 8.

Figure 1:
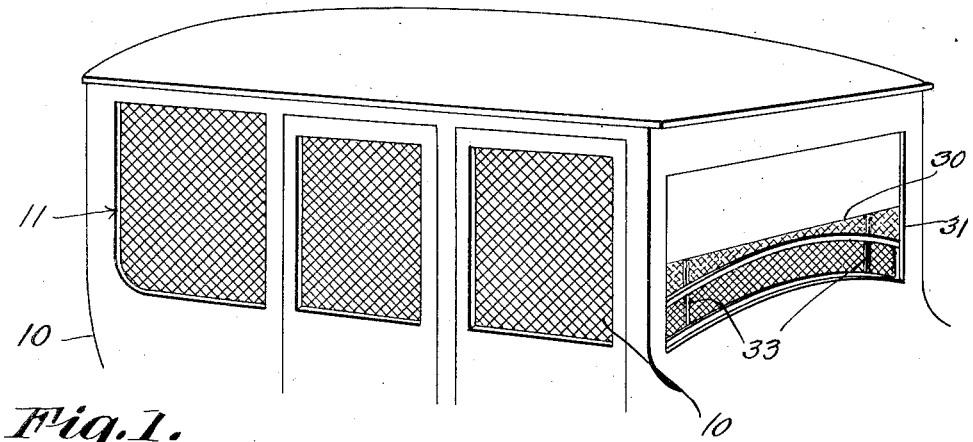
Figure 1 is a perspective view of a portion of an automobile body showing the same equipped with the improved insect screens.
Figure 2:
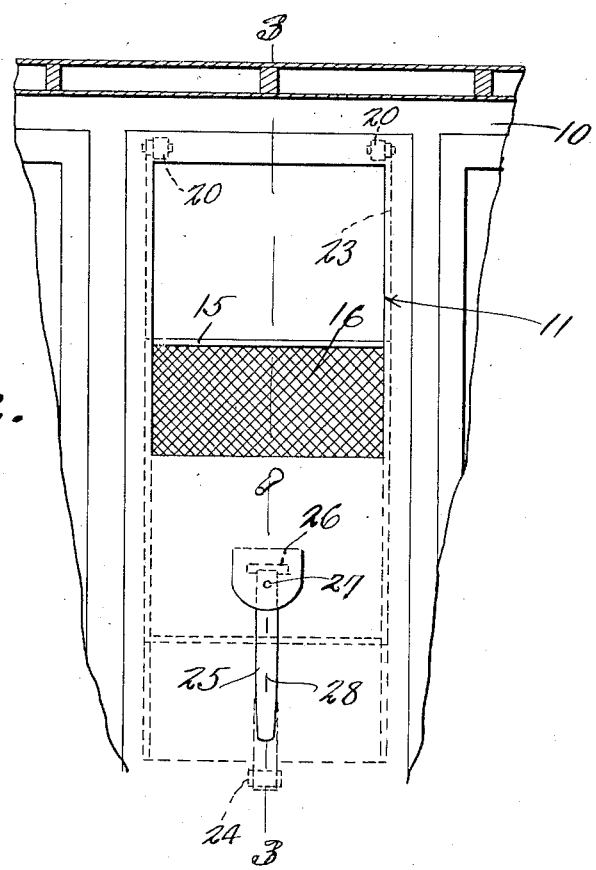
Figure 2 is an interior elevation of a portion of such body showing the arrangement of one of the window screens.

In carrying out this invention it is to be understood that the window screens are to be used in connection with the usual glass windows sliding in and out of pockets below the window openings and a portion of an automobile body 10 is provided in the usual manner with window openings 11 below each of which is a pocket 12 so that the windows 13 may slide in and out of these pockets to open and close the window openings. The mechanism for operating the windows is not here shown as the same is old and well known and also forms no part of the present invention.

Each window opening is provided with a pair of opposed guide grooves 14 formed in the sides of the window frame and extending downwardly into the respective pocket. Slidably mounted in each pair of grooves 14 is a screen frame 15 provided with suitable screen wire 16 and thus the screens have the same sliding movement as the glass windows. Housed in the top of the window frame at each side thereof is a pair of brackets 17 which support a shaft 18 fixed against rotation by a pin 19 extending into a bracket and through said shaft. On this shaft is revolubly mounted a casing 20 from one end of which extends a drum or spool 21 surrounding the shaft and revolving with the casing. Within the casing is a spiral spring 22 one end of which is fixed to the shaft and its other end fixed to the inside of the casing so that rotation of the casing in one direction will wind the spring. The drum has wound thereon a tape 23, the winding being opposite that of the spring so that unwinding the tape winds the spring, and the free end of each tape is fixed to the respective upper corner of a screen frame. Thus, as the screen is lowered in the opening movement the spring is tensioned and acts as a counter-balance for the screen.

Near the bottom of each pocket there is provided an idler pulley 24 and a strap 25 has one end fixed to the bottom of the respective screen frame and passes downwardly beneath the pulley and then upwardly and through an opening 26 in the inside wall of the pocket, the end of the strap hanging down inside the automobile body. Just below the opening 26 there is provided a button 27 and the free end of the strap 25 is provided with a series of spaced button holes 28 engageable on the button selectively so as to regulate the height at which the screen is held raised by the springs 22. Obviously pulling on the strap lowers the screen and releasing the pull on the strap permits the screen to rise. A flap 29 serves to cover and conceal the opening 26.

At the windshield the arrangement is somewhat different, the screen being fixed in position at this point. In order to screen the opening when the windshield is slid upwardly there is provided a screen frame 30 which is attached by its sides to the side posts 31 of the body front, the lower member of the frame conforming to the shape of the cowl of the automobile. The frame is fitted with the usual screen wire 32. On to the rear face of this screen wire is secured a plurality of spaced channel strips 33 having their flanges turned inwardly toward each other. These channel strips extend vertically of the screen with their open side rearwardly disposed and thus not only stiffen the screen but, which is more important, provide guides for the reception of the T-heads 34 of guide clips 35 which are secured to the windshield frame at its bottom edge between the glass and said frame as shown in Figure 6. By this means the screen is held close to the glass both in the closed and open position of the windshield so that flapping and rattling of the screen against the glass is prevented and no space is left for the entry of insects. Thus the windshield can be raised to any desired extent while leaving the opening securely screened. It is also to be noted that the screen, as thus constructed, is below the line of vision of the driver and thus does not interfere with his driving.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

An automobile window comprising a frame having an opening and provided at the inner edges of its side members with vertically disposed grooves, a sash mounted for sliding movement in the grooves, casings journaled in the frame above the upper corners of the opening therein, springs connected with the frame and the respective casings for rotating the same, spools formed at the ends of the casings, said spools being less in diameter than the diameter of the casings, tapes arranged to wind spirally upon the spools, said tapes being trained into the grooves between the side walls thereof and connected with the corners of the sash.

In testimony whereof I affix my signature.

HENRY D. HAMP.